Figure 4:
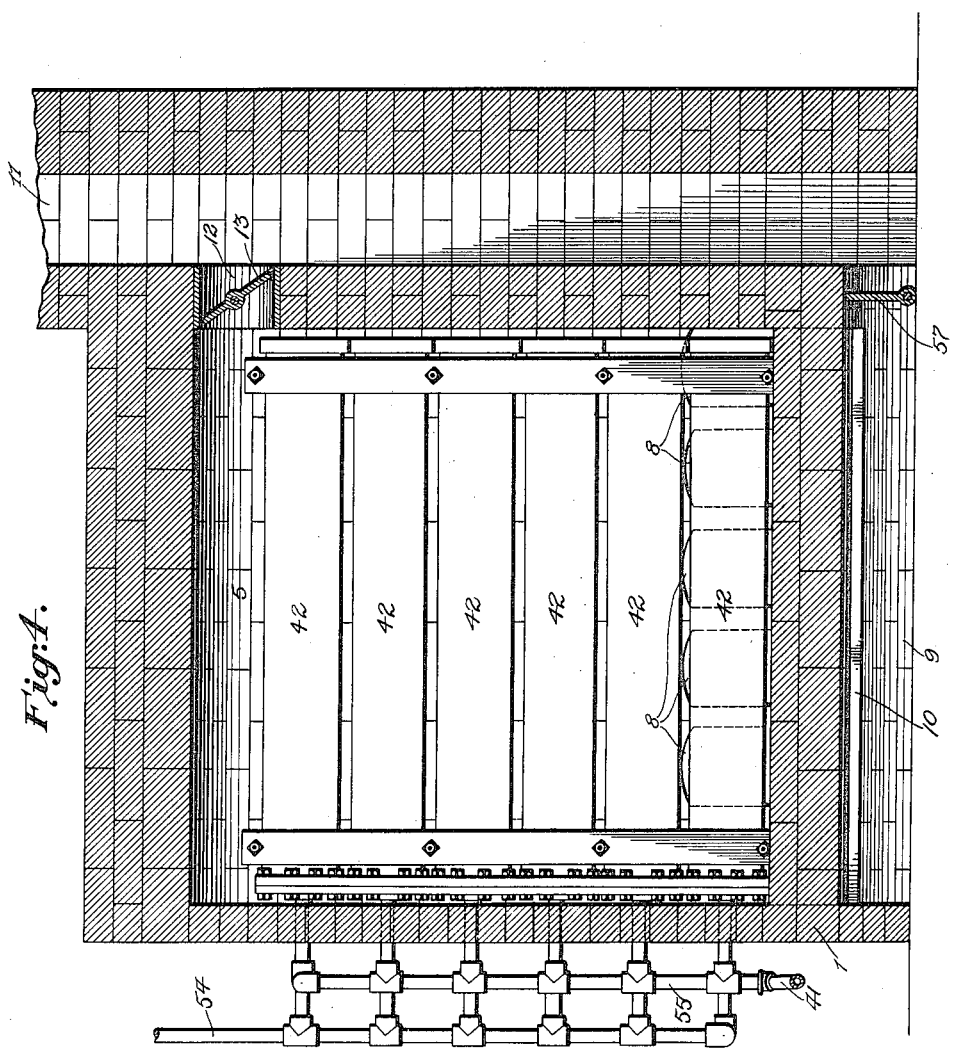

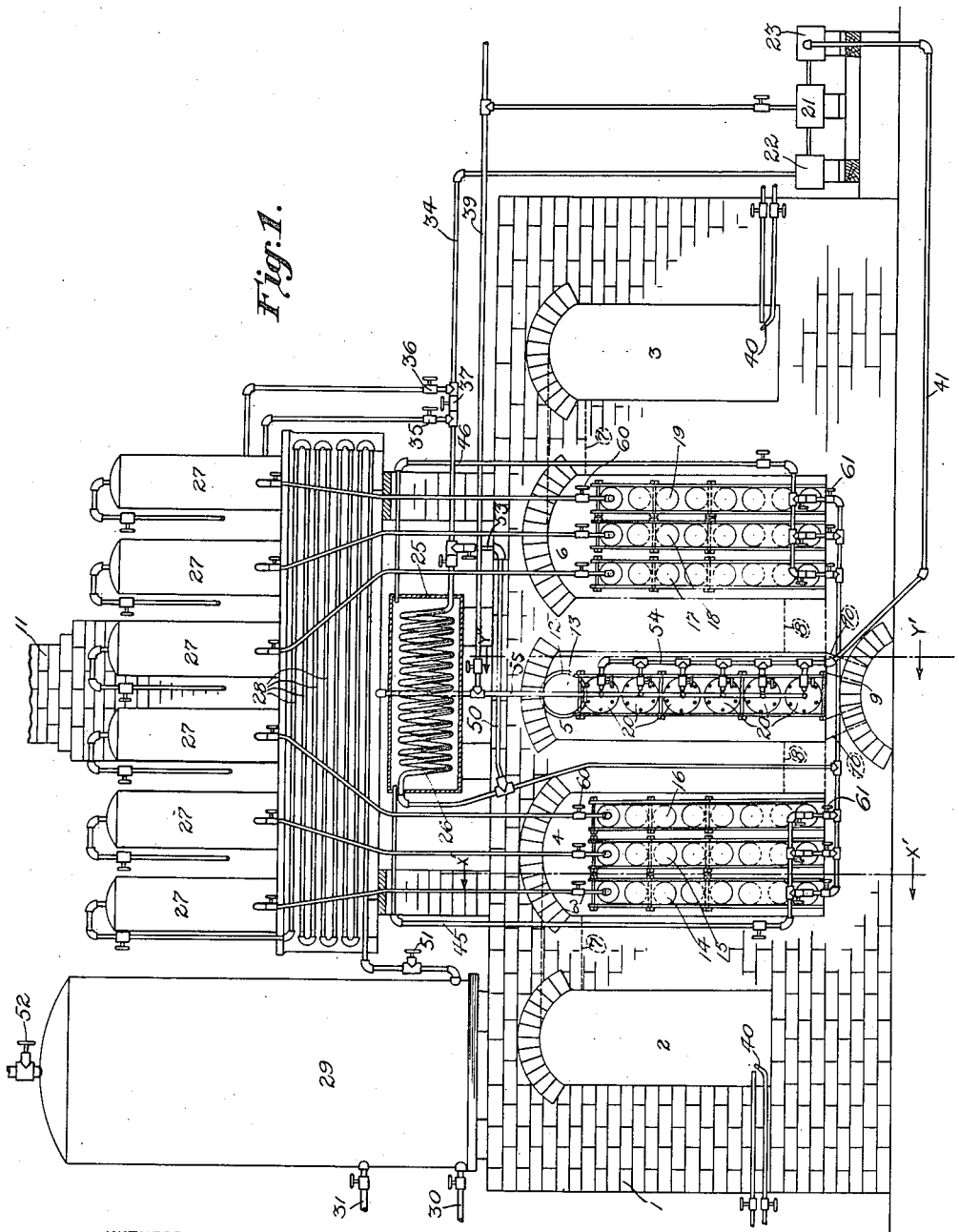

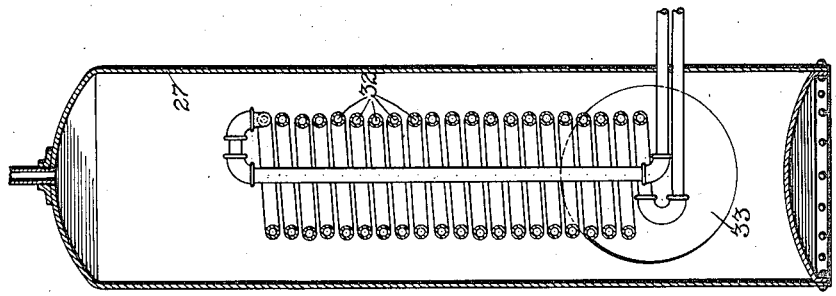
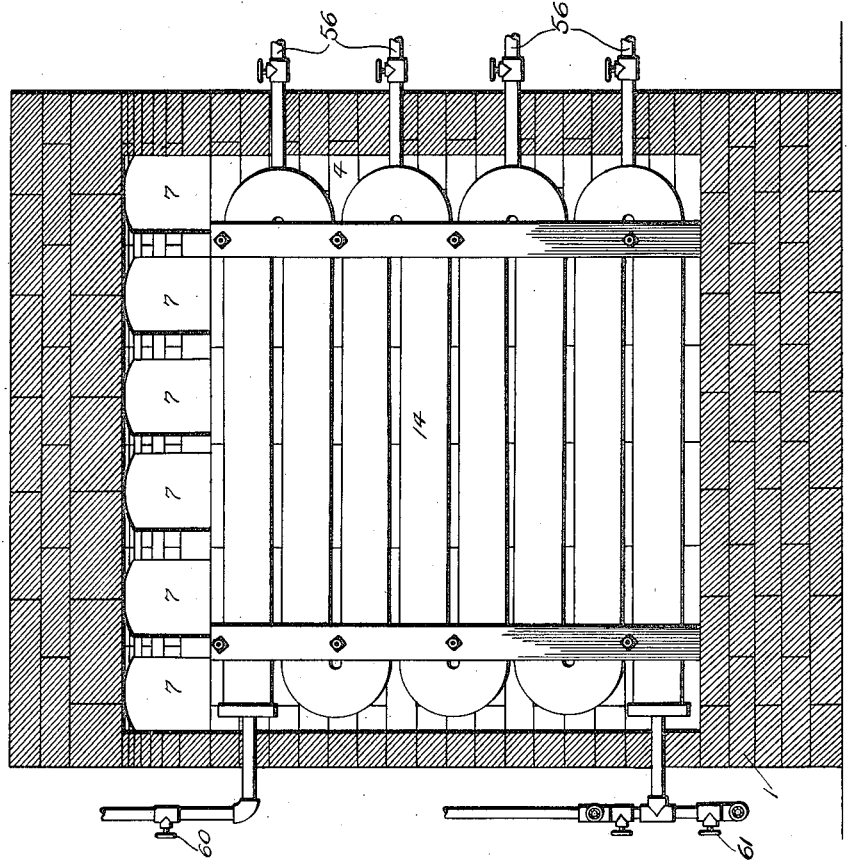

R. SEEGER.
APPARATUS FOR THE TREATMENT OF HYDROCARBON OILS.
APPLICATION FILED SEPT. 23, 1916.

1,259,786.

Patented Mar. 19, 1918.
4 SHEETS—SHEET 3.

WITNESS

Charles A. Becker.

INVENTOR.
Robert Seeger;
BY
E. E. Huffman
ATTORNEY

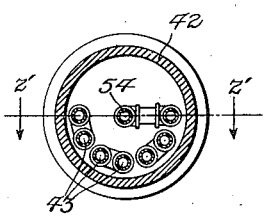
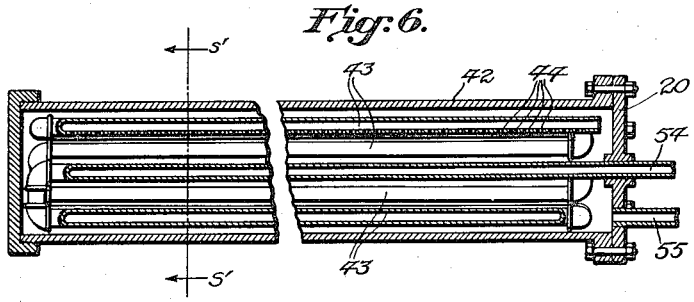
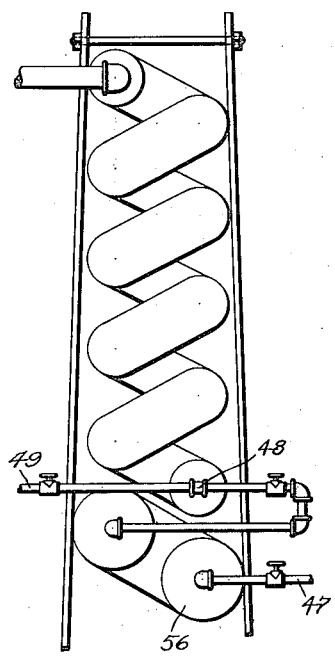
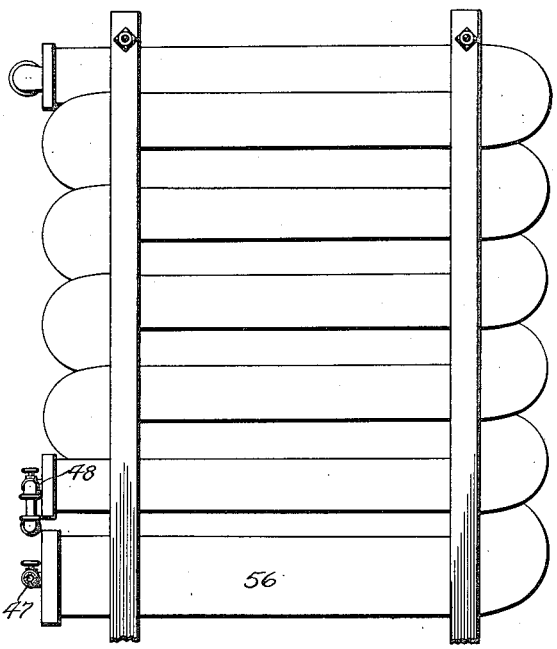

UNITED STATES PATENT OFFICE.

ROBERT SEEGER, OF ST. LOUIS, MISSOURI, ASSIGNOR TO NEW PROCESS OIL COMPANY, A CORPORATION OF MINNESOTA.

APPARATUS FOR THE TREATMENT OF HYDROCARBON OILS.

1,259,786.      Specification of Letters Patent.      Patented Mar. 19, 1918.

Application filed September 23, 1916. Serial No. 121,711.

*To all whom it may concern:*

Be it known that I, ROBERT SEEGER, a citizen of the United States of America, residing at the city of St. Louis, State of Missouri, United States of America, have invented a certain new and useful Apparatus for the Treatment of Hydrocarbon Oils, of which the following is such a full, clear, and exact description as will enable any one skilled in the art to which it appertains to make and use the same, reference being had to the accompanying drawings, forming part of this specification.

My invention relates to an apparatus for treating petroleum or other heavy hydrocarbon oils to produce lighter hydrocarbons therefrom. Its objects are to provide efficient and easily controlled apparatus for this purpose, which shall have relatively large capacity; to provide means insuring the mixing of the oil to be treated with water or steam in constant proportions; to utilize the waste heat of the furnace for heating the water used; to utilize the heat of the vapors produced in the "cracking" operation for preheating the oil to be cracked; and to provide an improved form of steam generating means associated with the cracking coils and other apparatus to supply moist steam to be mixed with the oil to be treated.

Other objects and advantages of my invention will appear from the following more detailed description.

In the accompanying drawings which illustrate one embodiment of my invention, Figure 1 is a front elevational view showing the furnace with the front walls of the various chambers removed, cracking coils, steam generators, pumps and vapor collecting and condensing means; Fig. 2 is a view partly in elevation and partly in section taken along the line $xx'$ of Fig. 1; Fig. 3 is a cross-sectional view of one of the vapor collecting tanks shown in Fig. 1, together with an oil preheating coil inclosed therein; Fig. 4 is a view partly in cross-section and partly in elevation along the line $yy'$ of Fig. 1; Figs. 5 and 6 illustrate one of the steam generators employed as a part of my apparatus, Fig. 5 being a cross-section along the line $ss'$ of Fig. 6, and Fig. 6 being a cross-section along the line $zz'$ of Fig. 5; Fig. 7 is an end view, and Fig. 8 a side view of a modified form of cracking coil.

The furnace 1 is provided with combustion chambers 2 and 3 and heating chambers 4, 5 and 6. The combustion chamber 2 communicates with the heating chamber 4 at points adjacent to the top of the latter through the openings 7, as shown in Fig. 2. In like manner the combustion chamber 3 communicates with the top of the heating chamber 6 through similar openings. Heating chambers 4 and 6 communicate with the heating chamber 5 through openings 8 in the respective separating walls near the bottoms thereof, as shown in Fig. 4. Heating chamber 5 communicates with flue 9 through a number of openings 10 in the bottom of the chamber. This flue is provided with a damper 57 and connects with chimney 11 as shown in Fig. 4. The opening 12 controlled by the damper 13 also connects the chimney with the upper part of the heating chamber 5.

Each of the heating chambers 4 and 6 contain three independent sets of cracking coils, 14, 15, 16, and 17, 18, 19. Heating chamber 5 contains a plurality of steam generators 20. 25 is a steam collecting drum connected to the generators 20 and in which is placed an oil preheating coil 26. The drum 25 is in turn connected with the cracking coils through pipes 45 and 46. Vapor collecting tanks 27 are each connected to one of the cracking coils of the furnace and to condensing coils 28, these condensing coils being in turn connected with a collecting and storage tank 29 at a point near the bottom thereof. The tank 29 is provided with a water draw-off pipe 30 near the bottom and oil draw-off pipe 31 at a point higher up. One or more of the vapor tanks 27 contains an oil preheating coil 32 which may either be inserted in the tank through a manhole 33 in the side thereof, or from the top of the tank when same is provided with a removable cover. Each end of the oil preheating coil 32 is connected to the oil supply pipe 34, valves 35, 36 and 37 being provided whereby the oil to be treated may be caused to pass through the coil 32 or not, as desired. In order that coils 32 alone may be used to preheat the oil a by-pass pipe 53 and suitable valves are provided whereby the oil may reach the oil supply pipe 50 connected to the cracking coils without passing through the coil 26.

21 is a steam engine supplied from a boiler (not shown) and operates oil pump 22 and water pump 23. The steam pipe from the boiler, in addition to being connected to the steam chest 21 is also connected through a suitable valve to the pipe 39 which connects the steam drum 25 with the steam generators 20. By this means a supply of steam for mixing with the oil is available should the generators 20 be temporarily out of service.

In the operation of the apparatus above described a high degree of heat is produced in the combustion chambers 2 and 3 in any suitable manner, such as by coal, or by oil or gas burners 40 diagrammatically illustrated. This heat passes through the heating chambers 4 and 6 and into the heating chamber 5. From 5 it passes into the chimney 11 through the flue 9 or the opening 12 or partly through each when the positions of the dampers permit. By means of the damper 13 the degree of heat in the chamber 5 can be controlled independently of the temperature of the gases entering this chamber from the heating chambers 4 and 6, since if the damper is entirely closed the hot gases pass almost directly from chambers 4 and 6 to the flue 9, but with this damper open a certain portion of these gases will rise to the top of the chamber 5 and pass out through the opening 12.

By providing means whereby the oil pump and the water pump are operated simultaneously and from the same source of power, I am able to control the proportion of water and oil supplied to the cracking coils, and therefore keep this proportion constant. The water from the pump 23 is forced into each of the independent steam generators 20 through the pipe 41 and its connections as shown. Each of these steam generators comprises a metallic cylinder or casing 42 and a plurality of tubes therein connected and arranged to form a semi-cylindrical coil 43. The last tube of each coil 43 is provided with a number of perforations 44 and the other end of each coil is connected to the water pipe 41 through branch pipes 54. The degree of heat in the furnace chamber 5, the length of the coil in each generator and the rate of supply of water is so arranged that the water will all be reduced to steam by the time it issues from the coil. This steam is confined in the casings 42 and each of these casings is connected through branch pipes 55 to the common pipe 39 which conveys the steam to the steam drum 25, which is in turn connected to the cracking coils in the furnace, as before stated.

The oil to be treated is pumped by the pump 22 either through preheating coils 32 in one or more of the tanks 27, or through preheating coil 26 in the steam drum 25 or through both the coils 26 and 32. After being preheated the oil passes through the pipe 50 to each of the cracking coils. It will be noted that the arrangement of the valve and connections is such that the steam and oil are supplied to the same portion of each cracking coil and that the supply of steam and oil to each cracking coil may be cut off or varied without disturbing the supply to the other cracking coils.

The cracking coils are subjected to a temperature preferably not lower than 750° Fahr. and the valves 51 in the pipes leading to the storage tank are so set, and the supply of oil so regulated, as to cause the maintenance of a relatively high pressure in the cracking coils, for example from five to twenty atmospheres. In order to minimize the production of free carbon, I have found it desirable to introduce moist steam into the cracking coils, that is to say, steam whose temperature does not exceed 250° Fahr. The pressure of the steam due to its temperature, may be therefore considerably less than the pressure in the cracking coils. Pump 23, however, not only furnishes water to the steam generators for producing this moist steam, but also produces the pressure necessary to force it into the cracking coils. The temperature of the steam is regulated by regulating the degree of heat in furnace chamber 5.

Each of the cracking coils is connected to a vapor collecting tank 27 and each of these tanks is connected, as previously stated, to a suitable condensing coil 28. The oil and water vapors produced in the cracking coils pass into the tanks 27, are condensed to a liquid state before issuing from the condensing coil 28, and become separated in the tank 29, the water of course occupying the lower portion of the tank and the oil, which is lighter, the upper portion. Any uncondensed gas which reaches the tank 29 may be allowed to escape therefrom through the gas relief valve 52. The cracking coils may be provided with carbon blow-out pipes 56, as described in my co-pending application, Serial No. 117,176.

In Figs. 7 and 8 I have shown a modified form of a cracking coil in which there are two vertical rows of tubes arranged in staggered relation and connected at their ends to form a continuous coil. This arrangement makes possible a somewhat more efficient utilization of furnace space. I may also provide in connection with coils like those just described, or of any other suitable form, tubes 56 preferably of larger diameter than the tubes of the coil, and which serve as preheaters of the oil. Oil would be introduced through pipe 47, and after being heated would be supplied to the cracking coil at 48 where it is mixed with steam from pipe 49.

It will be understood that the cracking coils and delivery pipes therefrom are not necessarily of the relative proportions shown on the drawings. It will also be understood that the pressure in the cracking retorts may be maintained by valves 60 or 61 instead of by valves 51 in case it is desired that the vapors be condensed under atmospheric pressure or pressures less than those maintained in the cracking retorts.

Having fully described my invention, what I claim as new and desire to secure by Letters Patent of the United States is:

1. A furnace for treating hydrocarbon oils, comprising a heating chamber, a cracking retort in said chamber, a second heating chamber heated by gas issuing from the first chamber, steam generating means in said second chamber, and means for controlling the temperature of the second heating chamber independently of the temperature of the first heating chamber.

2. A furnace for treating hydrocarbon oils, comprising a heating chamber, a cracking retort in said chamber, a second heating chamber communicating with the first heating chamber and provided with spaced outlets for controlling the temperature thereof, and steam generating means in said second heating chamber.

3. In an apparatus for treating hydrocarbon oils, the combination with a furnace provided with two separate but communicating heating chambers, a cracking retort in the first heating chamber, steam generating means in the second chamber and connected to the cracking retort, means for forcing water into the steam generator, means for simultaneously introducing oil into the cracking retort, and means for controlling the heat in the second chamber to prevent raising the temperature of the steam above 250° Fahr.

4. A furnace for treating hydrocarbon oils, comprising a heating chamber, a cracking coil in said heating chamber, a second heating chamber communicating with the first heating chamber, steam generating means in said second chamber, a flue communicating with the second chamber adjacent to the bottom thereof, and a chimney communicating with the flue, said chimney also communicating with the second heating chamber at a point adjacent to the top thereof.

5. A furnace for treating hydrocarbon oils, comprising a heating chamber, a cracking retort in said chamber, a second heating chamber communicating with the first, steam generating means in said second chamber, a chimney, means providing two outlets from the second heating chamber to said chimney, and a damper controlling one of said outlets.

6. In an apparatus for treating hydrocarbon oils, the combination of a furnace, a plurality of cracking coils and a plurality of steam generators therein, pumps driven simultaneously from a common source of power for supplying oil to the cracking coils and water to the steam generators, and a plurality of vapor collecting tanks each connected to a cracking coil.

7. In an apparatus for treating hydrocarbon oils, the combination of a furnace, a plurality of cracking coils and a plurality of steam generators therein, pumps driven simultaneously from a common source of power for supplying oil to the cracking coils and water to the steam generators, a plurality of vapor collecting tanks each connected to a cracking coil, and a condenser for each vapor tank.

In testimony whereof, I have hereunto set my hand and affixed my seal.

ROBERT SEEGER. [L. S.]